United States Patent
Cai et al.

(10) Patent No.: US 11,576,181 B2
(45) Date of Patent: Feb. 7, 2023

(54) LOGICAL CHANNEL MANAGEMENT IN A COMMUNICATION SYSTEM

(71) Applicant: International Business Machines Corporation, Armonk, NY (US)

(72) Inventors: Zhuo Cai, Beijing (CN); Kushal S. Patel, Pune (IN); Sarvesh S. Patel, Pune (IN); Bing Xin Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 16/989,241

(22) Filed: Aug. 10, 2020

(65) Prior Publication Data
US 2022/0046647 A1     Feb. 10, 2022

(51) Int. Cl.
*H04W 72/04*     (2009.01)
*H04W 28/02*     (2009.01)
*H04W 72/08*     (2009.01)

(52) U.S. Cl.
CPC ... *H04W 72/0486* (2013.01); *H04W 28/0268* (2013.01); *H04W 28/0284* (2013.01); *H04W 72/087* (2013.01)

(58) Field of Classification Search
None
See application file for complete search history.

(56) References Cited

U.S. PATENT DOCUMENTS

| | | | |
|---|---|---|---|
| 5,553,094 | A | 9/1996 | Johnson |
| 10,244,509 | B2 | 3/2019 | Nigam |
| 2004/0236547 | A1 | 11/2004 | Rappaport |
| 2015/0282180 | A1 | 10/2015 | Owen |

(Continued)

FOREIGN PATENT DOCUMENTS

| | | |
|---|---|---|
| CN | 108513735 A | 9/2018 |
| EP | 3499785 A1 | 6/2019 |
| WO | 2015131119 A1 | 9/2015 |

(Continued)

OTHER PUBLICATIONS

Anonymous. "LTE eNB Architecture." Accessed Jun. 22, 2020. 4 pages. Published by Artiza Networks. https://www.artizanetworks.com/resources/tutorials/arc.html.

(Continued)

*Primary Examiner* — Mohammad S Adhami
(74) *Attorney, Agent, or Firm* — Haley McClory

(57) ABSTRACT

Embodiments of the present disclosure relate to logical channel management in a communication network. In an embodiment, a mapping between a plurality of logical channels of at least one terminal device and a plurality of resource sets of a network device is determined. The resource sets are assigned for communication between the at least one terminal device and the network device via the logical channels. If at least one resource set is overloaded, at least one of the plurality of logical channels is determined based on the mapping. Status information indicating that the at least one logical channel is in a congestion status is caused to be transmitted to a target terminal device of the at least one terminal device, the target terminal device communicating with the network device via the at least one logical channel.

14 Claims, 8 Drawing Sheets

(56) References Cited

U.S. PATENT DOCUMENTS

2019/0387429 A1* 12/2019 Basu Mallick ....... H04W 40/24
2021/0378018 A1* 12/2021 Jang .................. H04W 74/0833

FOREIGN PATENT DOCUMENTS

| WO | WO2017049728 | * | 10/2015 |
| WO | 2019062142 A1 | | 4/2019 |
| WO | WO2020259960 | * | 6/2019 |
| WO | 2019138518 A1 | | 7/2019 |
| WO | WO2021128913 | * | 12/2019 |

OTHER PUBLICATIONS

Anonymous. "Bearers, default Bearers, dedicated Bearers—naughty Bearers." Published Jan. 25, 2010. Accessed Jun. 22, 2020. 2 pages. Published by windancersth. https://windancersth.wordpress.com/2010/01/25/bearers-default-bearers-dedicated-bearers-naughty-bearers/comment-page-1/.
Anonymous. "Optimizing Network Applications for 5G." Published Apr. 21, 2017. Accessed Jun. 23, 2020. 2 pages. Published by Ericsson. https://www.ericsson.com/en/news/2017/4/optimizing-network-applications-for-5g.
Anonymous. "Quality of Service (QOS) in LTE." Accessed Jun. 23, 2020. 3 pages. Published by BEC Technologies. http://www.bectechnologies.net/main/newsletter_images/QoS.pdf.
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

LOGICAL CHANNEL MANAGEMENT IN A COMMUNICATION SYSTEM

BACKGROUND

The present disclosure generally relates to telecommunication and more particularly, to a method, system, and product for logical channel management in a communication system.

Communication systems are widely deployed to provide various types of communication content such as voice, data, and so forth. Generally, a multiple-access communication system can concurrently support communication for multiple terminal devices that communicate with one or more network devices. With the development of technologies, communication systems can support more sophisticated mechanisms for traffic differentiation than those of legacy systems, in order to fulfill diverse and more stringent end-to-end Quality of Service (QoS) requirements.

SUMMARY

Embodiments of the present disclosure include a method, computer program product, and system for logical channel management in a communication system.

According to some aspects of the present disclosure, there is provided a computer-implemented method. According to the method, a mapping between a plurality of logical channels of at least one terminal device and a plurality of resource sets of a network device is determined. The plurality of resource sets are assigned for communication between the at least one terminal device and the network device via the plurality of logical channels. In accordance with a determination that at least one of the plurality of resource sets is overloaded, at least one of the plurality of logical channels is determined based on the mapping. Status information indicating that the at least one logical channel is in a congestion status is transmitted to a target terminal device of the at least one terminal device, the target terminal device communicating with the network device via the at least one logical channel.

According to some aspects of the present disclosure, there is provided a computer-implemented method. According to the method, status information is received from a network device, the status information indicating that at least one logical channel of a target terminal device is in a congestion status. A resource set of the network device is assigned for communication between the target terminal device and the network device via the at least one logical channel. In response to the status information, an operation is determined to be applied on the at least one logical channel based on at least one of a workload pattern of the at least one logical channel and a quality of service (QoS) requirement for the least one logical channel.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
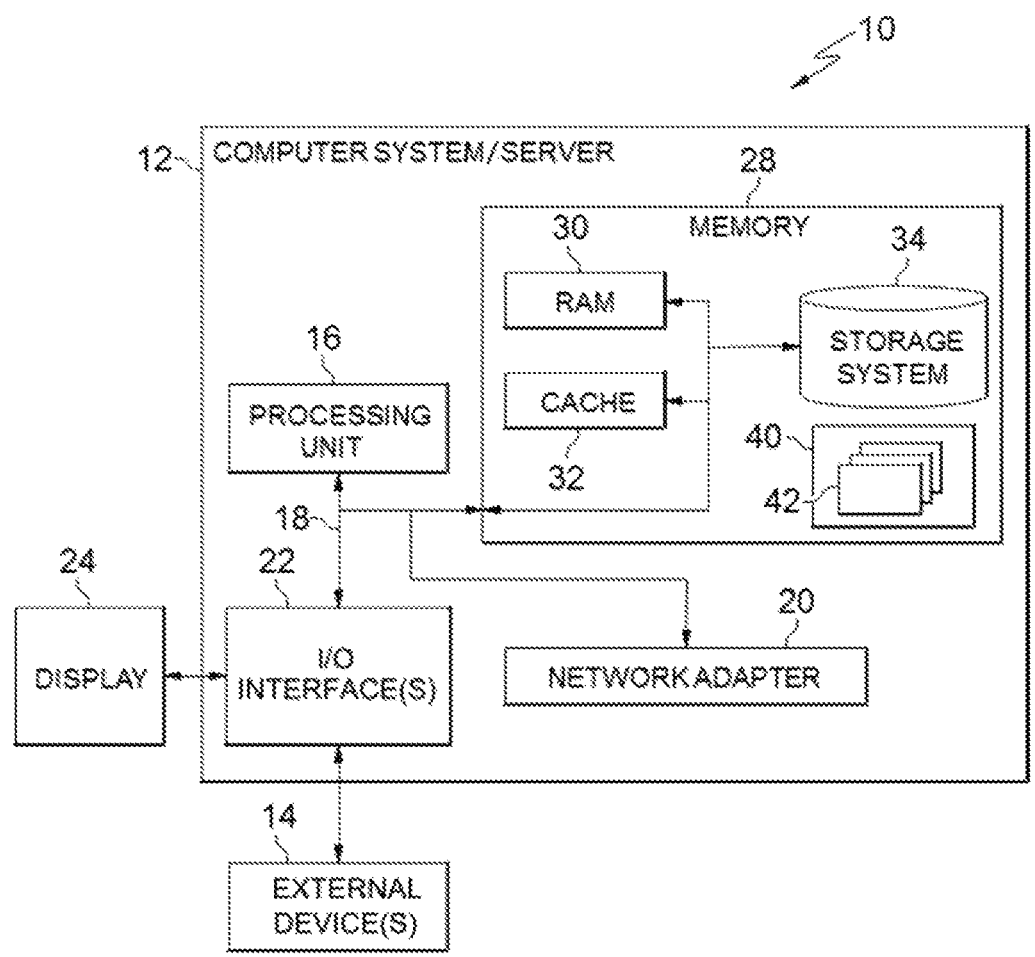
FIG. 1 illustrates a cloud computing node, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to telecommunication and more particularly, to a method, system, and computer program product for logical channel management in a communication system. While the present disclosure is not necessarily limited to such applications, various aspects of the disclosure may be appreciated through a discussion of various examples using this context.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
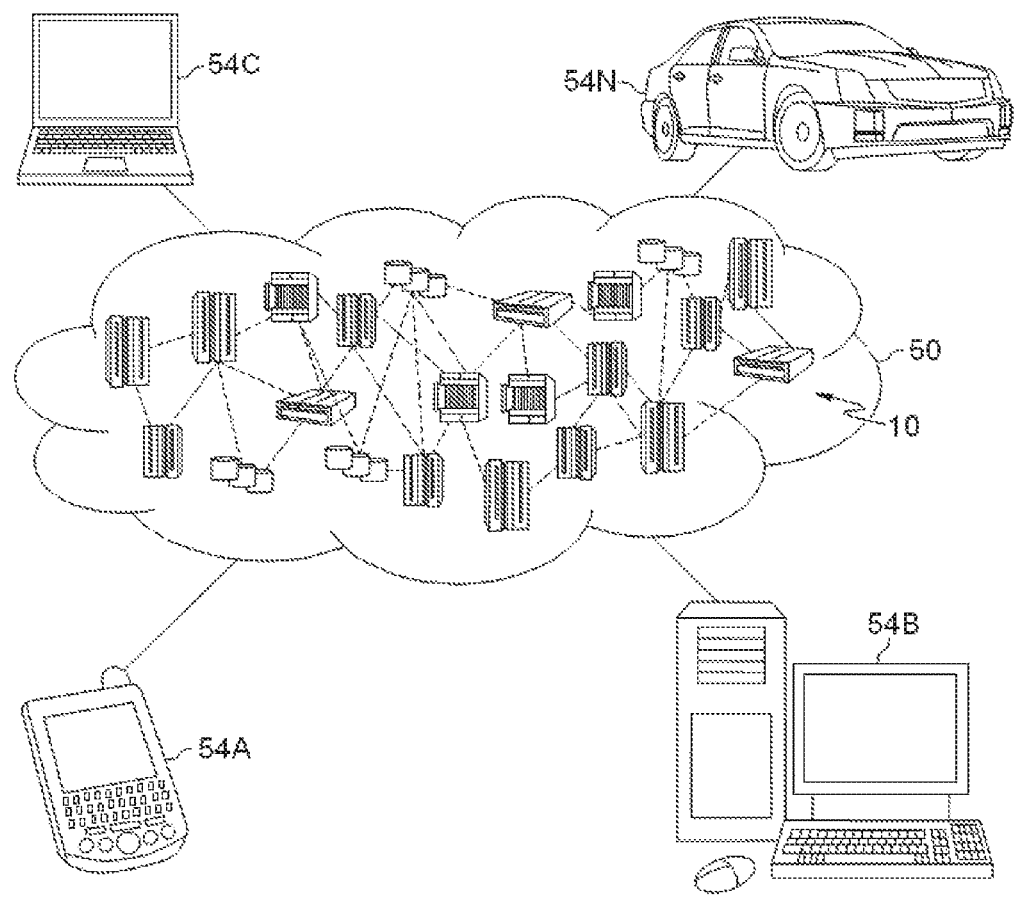
FIG. 2 illustrates a cloud computing environment, in accordance with aspects of the present disclosure.

Referring now to FIG. 2, illustrative cloud computing environment 50 is depicted. As shown, cloud computing environment 50 includes one or more cloud computing nodes 10, which may be the same or substantially the same as cloud computing node 10 of FIG. 1, with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
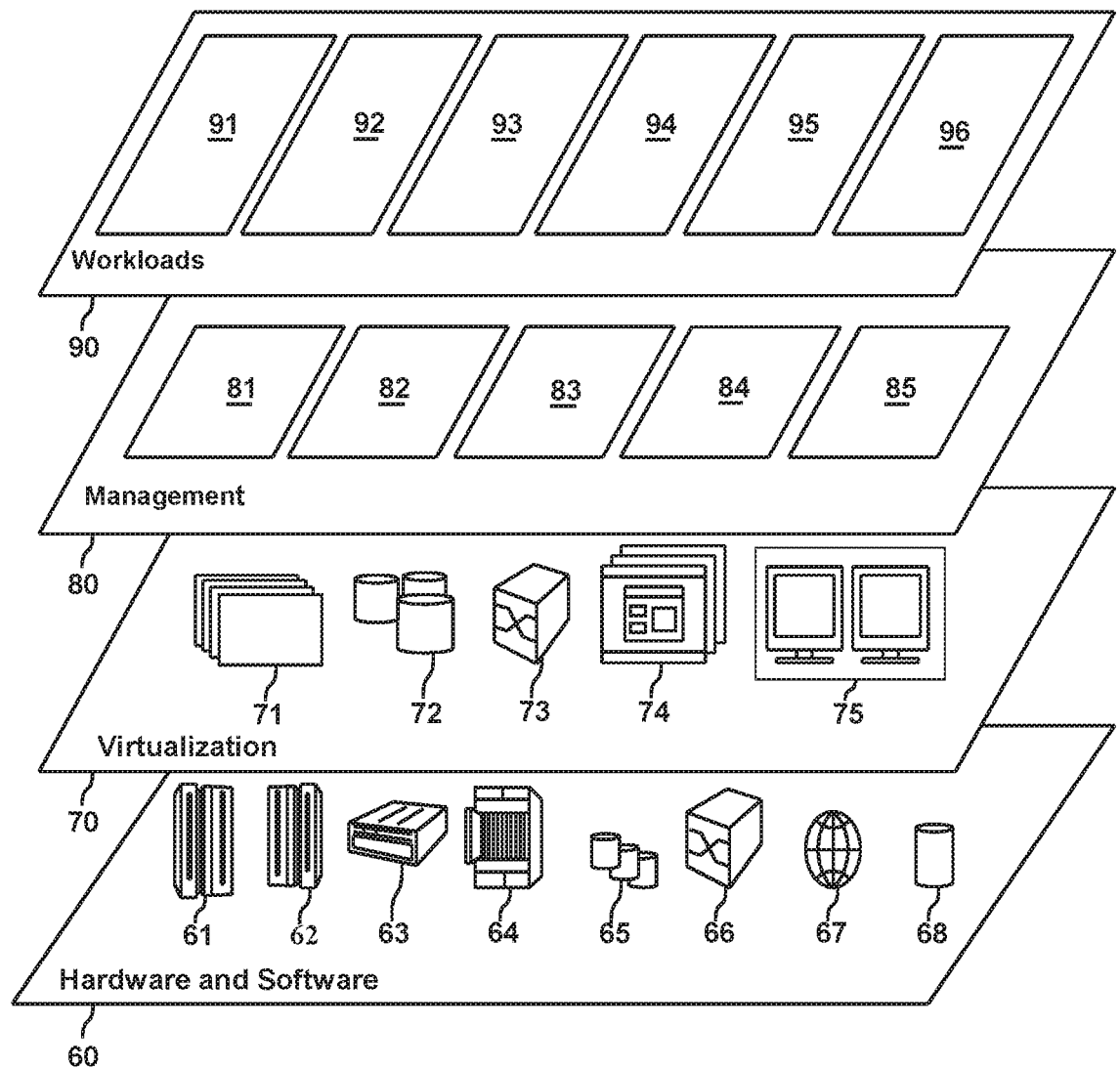
FIG. 3 illustrates abstraction model layers, in accordance with aspects of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and logical channel management 96. The functionalities of logical channel management 96 will be described in the following embodiment of the present disclosure.

As used herein, the term "communication system" or "communication network" refers to a system or network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT), etc. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, or the fifth generation (5G) communication protocols; new radio (NR) protocols; and/or any other protocols either currently known or to be developed in the future. Embodiments of the present disclosure may be applied in various communication systems. Given the rapid development in communications, there may also be future communication technologies and systems with which the present disclosure may operate. The present disclosure should not be read as limited to only the aforementioned systems.

As used herein, the term "network device" refers to a node in a communication network via which a terminal device accesses the network and receives services therefrom. The network device may refer to a base station (BS) or an access point (AP) (for example, a node B (NodeB or NB)), an evolved NodeB (eNodeB or eNB), a New Radio NB (also referred to as a gNB), a Remote Radio Unit (RRU), a radio header (RH), a remote radio head (RRH), a relay, an Integrated Access and Backhaul (IAB) node, a low power node (such as a femtocell or a picocell), a non-terrestrial network (NTN), or non-ground network device (such as a satellite network device, a low earth orbit (LEO) satellite, a geosynchronous earth orbit (GEO) satellite, an aircraft network device, and so forth, depending on the applied terminology and technology).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but is not limited to, a mobile phone, a cellular phone, a smart phone, a voice over IP (VoIP) phone, a wireless local loop phone, a tablet, a wearable terminal device, a personal digital assistant (PDA), a portable computer, a desktop computer, an image capture terminal device (such as a digital camera), a gaming terminal device, a music storage and playback appliance, a vehicle-mounted wireless terminal device, a wireless endpoint, a mobile station, laptop-embedded equipment (LEE), laptop-mounted equipment (LME), a USB dongle, a smart device, wireless customer-premises equipment (CPE), an Internet of Things (IoT) device, a watch or other wearable, a head-mounted display (HMD), a vehicle, a drone, a medical device and application (e.g., remote surgery), an industrial device and application (e.g., a robot and/or other wireless device operating in an industrial and/or an automated processing chain context), a consumer electronics device, a virtual reality (VR) device, an augmented reality (AR) device, a device operating on commercial and/or industrial wireless networks, and the like. In the following description, the terms "terminal device," "communication device," "terminal," "user equipment" and "UE" may be used interchangeably.

Figure 4:
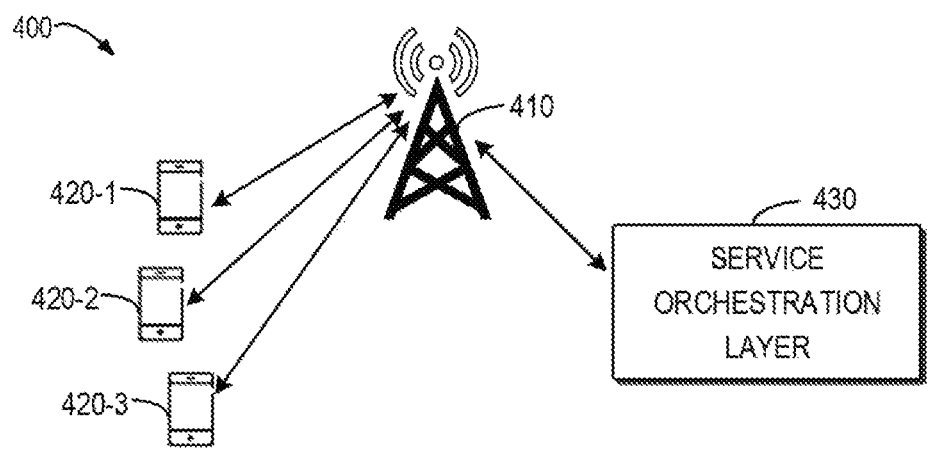
FIG. 4 illustrates an exemplary communication system, in accordance with aspects of the present disclosure.

FIG. 4 shows an exemplary communication system 400 in which exemplary embodiments of the present disclosure can be implemented. The communication system 400 includes a network device 410 that can communicate with one or more terminal devices 420-1, 420-2, 420-3. In the below description, the terminal devices 420-1, 420-2, 420-3 are collectively or individually referred to as terminal devices 420.

It is to be understood that the numbers of network devices and terminal devices are only for the purpose of illustration without suggesting any limitations. For example, the number of terminal devices connected to one network device may change over the time. The communication system 400 may include any suitable number of network devices and terminal devices adapted for implementing embodiments of the present disclosure.

Communications in the communication system 400 may be implemented according to any proper communication protocol(s), comprising, but not limited to, cellular communication protocols of the first generation (1G), the second generation (2G), the third generation (3G), the fourth generation (4G) and the fifth generation (5G) and on the like; wireless local network communication protocols such as Institute for Electrical and Electronics Engineers (IEEE) 802.11 and the like; and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or developed in the future.

In operation, the network device 410 can communicate data and control information to the terminal devices 420 and the terminal devices 420 can also communicate data and control information to the network device 410.

In the communication system 400, a plurality of bearer channels can be provided between the terminal devices 420 and the network device 410 to form a radio access network (RAN). The data transmitted and received over a radio channel are transported by a radio bearer between a terminal device 420 and a network device 410 and by an Si bearer between the network device and a serving gate (S-GW) (not shown).

Currently, with the development of technologies and the demands on the communications, a communication system, for example, a 5G communication system, can provide separation and prioritization of resources over a common infrastructure (e.g., an infrastructure cloud) for operational and security purposes. In the example communication system 400 in FIG. 4, a service orchestration layer 430 is included that is configured for arranging resources of the common infrastructure for the communication between the network device 410 and the terminal device(s) 420.

Further, it is possible to provide a capability of creating a plurality of logical channels over a single physical radio bearer, which enables high-speed and low-latency communication with smaller cell sizes. All the logical channels created over the single physical bearer use the same radio channel to transmit the data.

The logical channels may comprise logical traffic channels via which traffic is transmitted. The logical traffic channels may comprise logical traffic channels for traffic transmission. The logical traffic channels comprise dedicated traffic channels (DTCHs) which are point-to-point bi-directional channels dedicated to one terminal device for the transfer of user traffic. In some embodiments, more than one logical channel may be created for an application running on a terminal device 420.

In some typical cases, multiple applications may be running in a terminal device at a time, each having a different quality of service (QoS) requirement. For example, a terminal device can be engaged in a voice over Internet Protocol (VoIP) call while at the same time engaged in browsing a web page or downloading a file from the Internet. The VoIP call generally has a more stringent requirement for QoS in terms of delay and delay jitter than the browsing and file downloading that may afford delayed packet rates.

The design of the communication system may provide flexibility to support various applications meeting different requirements on a use case basis. Those use cases can be roughly categorized into three different groups. In one example, enhanced mobile broadband (eMBB) has high bits/sec requirements, with less stringent latency and reliability requirements. This also gives support for more devices and more data in densely populated areas and enables high-bandwidth applications such as VR and AR. In another example, ultra-reliable and low latency (URLL) has less stringent bits/sec requirements. In yet another example, massive machine type communication (mMTC) allows a large number of devices to be supported within a certain area, but the reliability/throughput/latency requirement could be less stringent.

As one of the major aims of communication systems is speed and data, there is a need for efficient data communication management and transmission across the underlying infrastructure. A general solution in the communication system based on a common infrastructure is that resources for a network device are allocated to each logical channel to support communications via each logical channel. As a plurality of logical channels are established from one or more terminal devices or one or more applications running on the terminal devices, the resources of the network device are allocated among the logical channels to the achieve parallelism among the logical channels.

Figure 5:
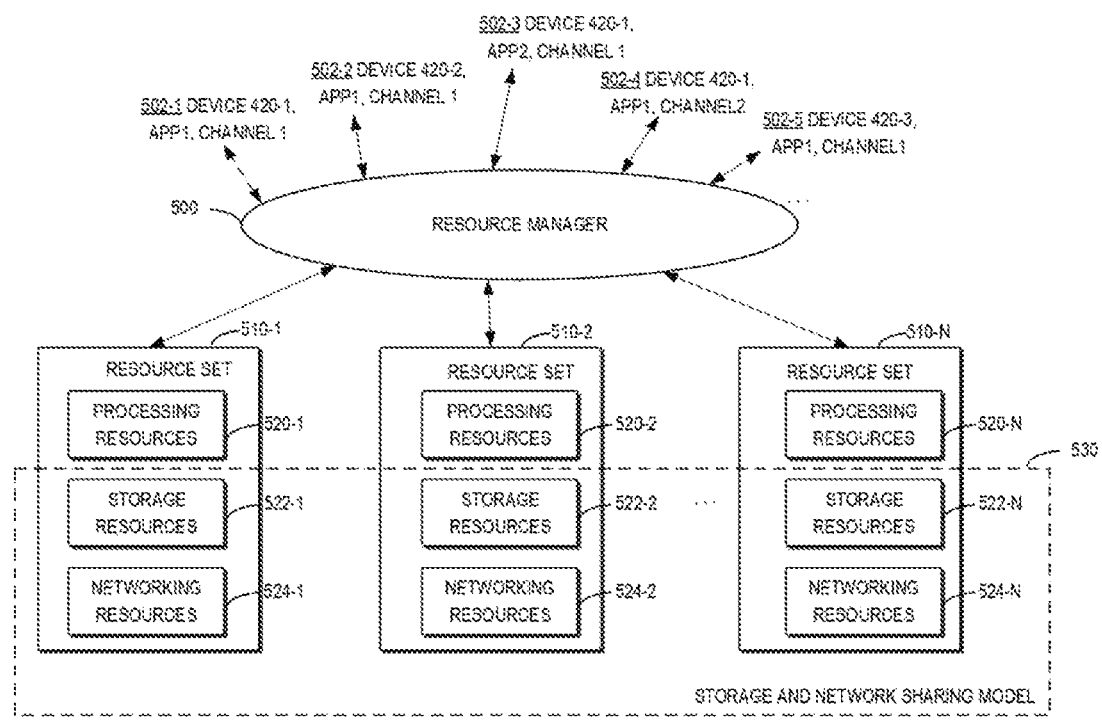
FIG. 5 illustrates an example of resource allocation for a plurality of logical channels, in accordance with aspects of the present disclosure.

FIG. 5 illustrates an example of resource allocation for a plurality of logical channels. In the illustrated example, resource sets 510-1, 510-2, . . . , 510-N (where N is an integer larger than one) are provided for the network device 410 in the communication system 400. For ease of discussion, the resource sets 510-1, 510-2, . . . , 510-N are collectively or individually referred to as resource sets 510.

Each resource set 510 includes resources that are used to support communication between the network device 410 and the terminal device(s) 420. Some example resources include processing resources and storage resources (e.g., for data processing, management, and control) and networking resources for providing network bandwidth for data transfer. As illustrated in FIG. 5, the resource set 510-1 includes processing resources 520-1, storage resources 522-1, and networking resources 524-2; the resource set 510-2 includes processing resources 520-2, storage resources 522-2, and networking resources 524-2, . . . ; and the resource set 510-N includes processing resources 520-N, storage resources 522-N, and networking resources 524-N. For ease of description, the processing resources 520-1, 520-2, . . . , 520-N are collectively or individually referred to as processing resources 520; the storage resources 522-1, 522-2, . . . , 522-N are collectively or individually referred to as processing resources 522; and the networking resources 524-1, 524-2, . . . , 524-N are collectively or individually referred to as networking resources 524.

The resource sets 510 may be established on an infrastructure pool which includes hardware devices providing corresponding types of resources. Some of the resource sets 510 may have their resources shared with each other, depending on a resource sharing model. For example, by applying a storage and network sharing model 530, the storage resources 522 and networking resources 524 are shared among the resource sets 510. It should be appreciated that other resource sharing strategies may be applied on two or more of the resource sets 510, where one or more types of resources can be shared. For example, an only-network sharing model may be applied to share the network resources 524 of two or more resource sets 510. In some embodiments, the resources are not shared among the resource sets 510 of the network device 410.

Upon establishment of logical channels between the network device 410 and one or more terminal devices 420, a resource manager 500 is configured to assign each logical channel to one of the resource sets 510. The assigned resource set 510 may be used to support communication between the network device and the corresponding terminal device via the logical channel. The resource manager 500 may be implemented either at the network device 410 or the service orchestration layer 430 in the communication system 400.

As mentioned above, a plurality of logical channels may be established from one or more terminal devices or one or more applications running on the terminal devices. In the example of FIG. 5, a logical channel 502-1 is established for a first application on the terminal device 420-1, represented as "Device 420-1, App1, Channel1," a logical channel 502-2 is established for a first application on the terminal device 420-2, represented as "Device 420-2, App1, Channel1," a logical channel 502-3 is established for a second application on the terminal device 420-1, represented as "Device 420-1, App2, Channel1," a logical channel 502-4 is established for the first application on the terminal device 420-1, represented as "Device 420-1, App1, Channel2," and a logical channel 502-5 is established for a first application on the terminal device 420-3, represented as "Device 420-3, App1, Channel1," and so on. Those logical channels 502-1 to 502-5 are collectively or individually referred to as logical channels 502. The resource manager 500 may assign the resources 510 of the network device 410 among the logical channels.

Since each resource set may be shared among multiple logical channels, it is likely that a number of logical channels are overlapping on a same resource set, especially on the same resource in the resource set. For example, a logical channel of a terminal device "A" and a logical channel of a terminal device "B" may be assigned to the same processing core in a resource set of the network device. In such case, data transmitted over the two logical channels from/to the two terminal devices are processed by the single resource set, which may essentially reduce parallelism and affect overall application performance. Sometimes when multiple terminal devices have connections established with the network device, some of the resource sets may be overloaded while some are under-loaded due to the logical channels overlapping certain resource sets.

As a result, the QoS requirements for the individual logical channels may not be guaranteed during the peak period. This also leads to performance degradation at the network device because of imbalanced resource usage across the network elements as additional burdens are added on some assets while others are free, thus reducing parallel processing and increment in overall delay and latency increment.

Currently, there is no means to tie the resource assignment to expected workloads and hence this can lead to significant workload imbalance across the resource sets available in the network device.

According to some embodiments of the present disclosure, there is provided a solution for logical channel management in a communication system. This solution is provided to detect workload imbalance among resource sets of a network device and notify one or more terminal devices regarding such a status. More specifically, the network device determines whether one or more resource sets are overloaded. If an overloaded resource set is found, the network device determines one or more logical channels mapped to the overloaded resource set according to a predetermined mapping between resource sets and logical channels established between one or more terminal devices and the network device.

The network device determines a target terminal device that communicates with the network device via the at least one logical channel and transmits to a terminal device information indicating that the one or more determined logical channels are in a congestion status. Upon reception of such information from the network device, the target terminal device can determine how to proceed with the one or more logical channels, for example, based on workload patterns of the one or more logical channels and/or QoS requirements for one or more logical channels.

Through the solution described above, it is possible to optimize communications over the logical channels. The terminal device can have a level of flexibility in deciding whether to abort or maintain the logical channel in response to determining a congestion status. This can help avoid the logical channel congestion in specific resource sets as well as meet the QoS requirements for the logical channels, thereby preventing the overall performance from degrading. The workload imbalance across the resource sets can be improved if certain logical channels mapped to the overloaded resource set(s) are aborted.

Example embodiments of the present disclosure will be described in detail below with reference to the accompanying drawings.

Figure 6:
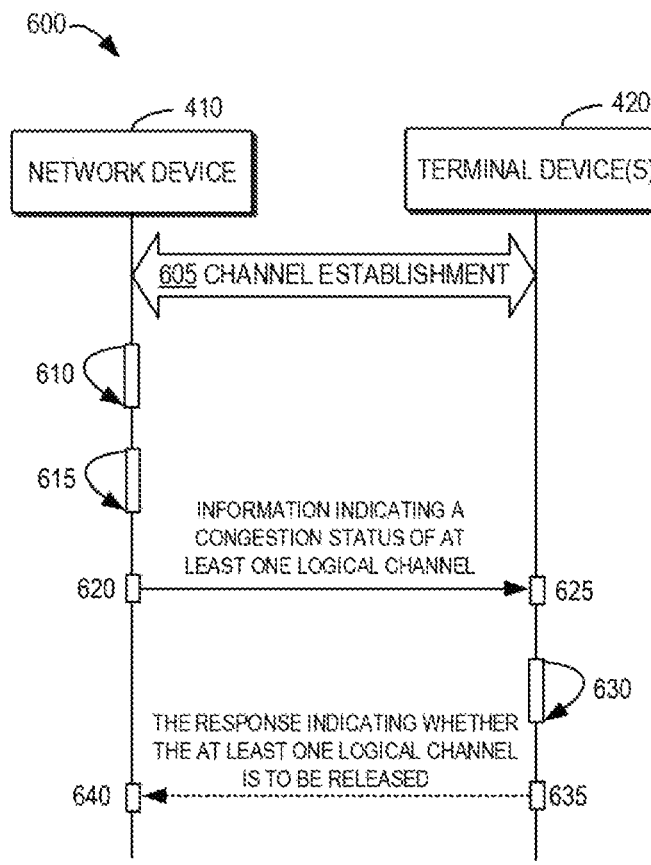
FIG. 6 illustrates a signaling flow for logical channel management, in accordance with aspects of the present disclosure.

Reference is now made to FIG. 6, which shows a signaling flow 600 for logical channel management according to some embodiments of the present disclosure. For the purpose of discussion, the signaling flow 600 will be described with reference to FIGS. 4 and 5. The signaling flow 600 involves the network device 410 and one or more terminal devices 420 in FIG. 4.

As illustrated, the network device 410 performs 605 channel establishment with one or more terminal devices 420. The terminal device(s) 420 may be located within service coverage of the network device 410. The number of the terminal device(s) 420 is not limited in the example embodiment of the present disclosure. During the channel establishment, a terminal device 420 may connect to the network device 410, and a radio bearer may be established between the terminal device 420 and the network device 410 (for example, after performing initial authentication and other checks on the terminal device 420). The radio bearer for the terminal device 420 may be identified by a bearer identifier (ID), which is used for further communication between the terminal device 420 and the network device 410.

The logical channels may comprise logical traffic channels via which traffic is transmitted and controlled, for example, logical traffic channels may be dedicated traffic channels (DTCHs). A DTCH is a point-to-point bi-directional channel dedicated to one terminal device for the transfer of user traffic.

One or more logical channels may be created on the radio bearer of a terminal device 420. In some embodiments, the logical channels are created for communication of one or more applications running on the terminal device 420 with the network device 410. Such applications may include, for example, an application for VoIP calls, an application for webpage browsing, an application for on-line video playback, an application for file uploading/downloading, etc. In some embodiments, more than one logical channel may be established for one application of a terminal device 420. One example is shown in FIG. 5, which illustrates the logical channels 502 created for the application on the terminal devices 420. For ease of description, the logical channels of the terminal devices 420 may be denoted as logical channels 502 in the following.

The created logical channels 502 of the terminal device(s) 420 may be identifier by corresponding channel IDs. In some embodiments, in addition to the specific channel ID, a logical channel 502 may be further identified by an application ID of the associated application, a device ID of the corresponding terminal device 420, and/or the like. The device ID may include, but is not limited to, a universally unique identifier (UUIDI), an Internet Protocol (IP) address, an International Mobile Subscriber Identity (IMSI) number, an Temporary Mobile Subscriber Identity (TMSI) number, and/or any other identification information.

Each of the logical channels 502 may have its associated QoS requirement and/or resource allocation requirement. The QoS requirement may be defined by one or more of the following: a QoS Class Identifier (QCI), which is a scalar that is utilized as a reference to bearer level packet forwarding treatment (e.g. scheduling weights, admission thresholds, queue management thresholds, link layer protocol configuration, etc.); an Allocation and Retention Priority (ARP), which is used to decide whether a bearer establishment or modification request can be accepted or needs to be rejected in cases of resource limitations; a Guaranteed Bit Rate (GBR), which denotes the bit rate that can be expected to be provided by a GBR radio bearer; and a Maximum Bit Rate (MBR) which indicates a limit to the bit rate that can be expected to be provided by a GBR radio bearer. The resource allocation requirement may define the requirement for network bandwidth (BW), processing resources, storage resources, and/or the like, in order to meet the QoS requirement.

In some embodiments, the QoS requirement and/or resource allocation requirement may be defined per application such that the logical channel 502(*s*) established for a same application may have the same requirement. In some embodiments, one or more logical channels 502 of a terminal device 420 may have specific QoS requirement and/or resource allocation requirement.

The logical channels 502 of the terminal device(s) 420 may be assigned to a resource set of the network device 410. The resource assignment may be performed by a resource manager at the network side, such as the resource manager 500 in FIG. 5. As a result, each logical channel 502 may be mapped to one of the resource sets 510 of the resource sets 510.

A resource set 510 includes resources that can be used to support communication between the terminal device 420 and the network device 410 via the mapped logical channel. The resource set 510 may include processing resources 520, storage resources 522, networking resources 524, and the like.

In some embodiments, the processing resources 520 may include one or more processors, processor cores, coprocessors, specialized execution units such as graphics processing units (GPUs), digital signal processors (DSPs), programmable logic devices such as field programmable gate arrays (FPGAs), or other logic circuits that can execute application specific or complex instructions. The processing resources 520 may include any types of processor (e.g., manufacturer, model), with various processing speeds, various numbers of processors, and various numbers of processor cycles per time interval (e.g., number of cycles per hour).

The storage resources 522 may include memory resources and persistent storage resources. The memory resources may include various levels of cache memories (e.g., one or more blocks of one or more of a Level 1 cache, a Level 2 cache, a Level 3 cache, a Level 4 cache, etc.), and their related structures, and system memories such as one or more banks of DRAMs, etc. The persistent storage resources may include disk space or other system storage. The networking resources 524 may include resources for transferring data between the terminal device(s) 420 and the network device 410, such as network interface components and network bandwidth. In some embodiments, some of the resource sets 510 may share one or more types of resources, an example of which is illustrated in FIG. 5.

With a plurality of logical channels 502 established, in the signaling flow 600, the network device 410 determines 610 a mapping between the plurality of logical channels of the terminal device(s) 420 and the plurality of resource sets 510 of the network device 410.

The network device 410 may monitor the establishment of the logical channels 502 and collect information about the established logical channels 502, such as the channel ID, the application and/or device IDs, and other identification information. The network device 410 may also obtain the resource assignment for the logical channels 502 in order to generate the mapping. In some embodiments, the mapping may be generated to include respective channel IDs and likely respective device IDs of the terminal device(s) 410 and/or respective application IDs of the corresponding applications, for identifying the specific logical channels 502. The mapping may also include respective set identifiers of the resource sets 510.

As the logical channels 502 of the terminal device(s) 410 may change as the communication ceases and starts, the network device 410 may continuously collect information about the established logical channels 502 and the mapped resource sets 510 to update the mapping.

In operation, the network device 410 may monitor respective workloads for the resource sets 510 and may determine whether any of the resource sets 510 are overloaded. In some embodiments, the network device 410 may detect whether the resource sets 510 are overloaded periodically or according to any other events.

In some embodiments, the network device 410 may determine the number of logical channels 502 mapped to each of the resource sets 510. If a large number of logical channels 502 (for example, larger than a predetermined threshold) are mapped to a same resource set 510, the network device 410 may determine that the resource set 510 is overloaded.

In some embodiments, the processing, storage, and/or networking capability of the resource sets may not be the same. The network device 410 may determine whether resources in a resource set 510 can be used to handle workloads of the logical channels 502 assigned to the resource set 510, including data transfer, data processing, data storage, and the like. To make the decision, the network device 410 may determine current workloads that are from the logical channel(s) 502 and are to be processed using the resource sets 510, for example, by checking the 10 queues created on each resource set 510. The workloads for each resource set 510 may include a processing workload to be processed using the processing resources 520, a storage workload to be handled with the storage resources 522, and a networking workload to be handled with the networking resources 524 in the resource set 510. For each type of workload, the network device 410 may determine whether the corresponding type of resources in the resource set 510 are sufficient enough to handle the workload in time.

In some embodiments, the network device 410 may obtain information about the resource sets 510, including about the resource sharing among the resource sets 510, the number of the resource sets 510, and the like, in order to determine the capability of each resource set. For example, if a certain type of resource, such as the networking resources of a resource set 510, is shared with one or more other resource sets 510, the network device 410 may combine the workloads of all those resource sets 510 to determine whether there are sufficient resources to handle the data transfer required by the combined workloads.

In some embodiments, determining whether a resource set 510 is overloaded may involve the network device 410 obtaining information about the respective QoS requirements for the logical channels 502 and/or the respective resource allocation requirements for the logical channels 502. The network device 410 may determine whether resources in a resource set 510 can be used to handle the workloads of the assigned logical channels 502 while meeting the QoS requirements and/or the resource allocation requirements.

If the resources in a resource set 510 cannot handle workloads of the logical channels 502 assigned to this resource set 510 or a large delay time is required for processing the workloads, the network device 410 determines that the resource set 510 is overloaded. In some embodiments where the QoS requirements and/or the resource allocation requirements are taken into account, if a resource set 510 fails to provide enough resources to meet a QoS requirement and/or a resource allocation requirement for one or more logical channels assigned to this resource set 510, the network device 410 determines that the resource set 510 is overloaded.

If one or more resource sets 510 are determined to be overloaded, a large number of logical channels 502 may be assigned to the one or more resource sets 510, which may affect the disequilibrium among the logical channels 502. The overloading in some of the resource sets 510 may further indicate workload imbalance among the resource sets 510 of the network device 410, resulting in some underloaded resource sets 510.

According to embodiments of the present disclosure, in the case that one or more resource sets 510 are determined to be overloaded, the network device 410 determines 615, based on the mapping, one or more of the logical channels 502 that are mapped to the overloaded resource set(s) 510. The network device 410 also determines one or more target terminal device(s) 420 that communicate with the network device 410 via the one or more determined logical channels 502. Depending on the logical channel(s) 502 determined, not all the terminal devices 410 connected to the network device 410 are determined as the target terminal device 420.

If one or more overloaded resource sets 510 are detected, the network device 410 transmits 620 status information of the one or more mapped logical channels 502 to the target terminal device(s) 420. For example, the network device 410 may control a wireless transcriber included in the device to perform the transmission of the status information. At the side of each target terminal device 420, it receives 625 the status information from the network device 410. For example, the target terminal device 420 may control a wireless transcriber included in the device to perform the reception of the status information.

As an example, the status information may indicate that the one or more mapped logical channels 502 are in a congestion status. As used herein, a congestion status of a logical channel 502 indicates that a workload communicated via this logical channel 502 cannot be well handled in terms of data processing, storage, and/or transfer due to the congestion/overlapping with multiple other logical channels in a same resource set 510. A congestion status of a logical channel 502 may result in potential large latency and performance degradation. By detecting the overloading in the resource set(s) 510 and notifying the terminal device(s) 420 of the congestion of the logical channel(s) 502, the workload imbalance and performance degradation can be quickly identified, allowing the terminal device(s) 420 to decide whether or not to maintain the current logical channel(s) 502.

In some embodiments, the communication of the status information between the network device 410 and the target terminal device 420 may be performed through an out-of-band protocol using out-of-band application programming interfaces (APIs). In some embodiments, the network device 410 and the target terminal device 420 may use in-band communication to transfer the status information, for example, by passing the status information as a part of a protocol frame programmatically.

Upon reception of the status information, each target terminal device 420 has the flexibility to determine how to proceed with the at least one logical channel 502 in the congestion status. Specifically, the target terminal device 420 determines 630 an operation to be applied on each logical channel 502 in the congestion status based on a workload pattern of the logical channel 502 and/or a QoS requirement for the logical channel 502. Possible operations to be applied on each logical channel 502 in the congestion status may comprise a first operation of releasing or aborting the logical channel 502 and a second operation of maintaining the logical channel 502. In some embodiments, the target terminal device 420 may determine to first release a logical channel 502 and then re-establish the logical channel 502 after a period of time.

The workload pattern of a logical channel 502 may indicate whether a workload to be communicated via this logical channel 502 is latency-sensitive or not. If the workload is latency-sensitive, it may not bear large performance degradation which will generally introduce large latency. Otherwise, if the workload to be communicated via this logical channel 502 is latency-insensitive, a relatively large latency due to the insufficient resources at the network device 410 is generally tolerable.

In some embodiments, the target terminal device 420 may determine whether the workload pattern of a logical channel 502 is a latency-sensitive workload pattern or a latency-insensitive pattern based on analysis of packet sizes transmitted over the corresponding logical channel 502. In an embodiment, if a logical channel 502 is established for communication of small-sized packets between the target terminal device 420 and the network device 410, which generally indicates that a higher speed of transmission is required, then this logical channel 502 may have a latency-sensitive workload pattern. If the logical channel 502 is established for communication of large-sized packets, the target terminal device 420 may determine that this logical channel 502 has a latency-insensitive workload pattern.

If a logical channel 502 in the congestion status has a latency-sensitive workload pattern, the target terminal device 420 may determine to perform the first operation of releasing this logical channel 502. For the released logical channel 502, the target terminal device 420 may determine to re-establish the logical channel 502 after a period of time or may totally abort this channel. In some cases, if a logical channel 502 in the congestion status has a latency-insensitive workload pattern, the target terminal device 420 may determine to perform the second operation of maintaining this logical channel 502 with the network device 410.

In addition to the workload pattern, or as an alternative, the target terminal device 420 may determine which operation to be applied on the logical channel(s) 502 of the congestion status based on its QoS requirement. The terminal device 420 may monitor a QoS on a logical channel 502 for a period of time and determine a decreased level of the QoS on this logical channel 502 over this period of time. If the decreased level exceeds a permissible limit according to the QoS requirement of this logical channel 502, the target terminal device 420 may determine to release the logical channel 502 by performing the first operation. The permissible limit may be defined in the QoS requirement. In some embodiments, if the decreased level is still within the permissible limit, the target terminal device 420 may determine to maintain the logical channel 502 by performing the second operation.

In some embodiments, the target terminal device 420 may provide feedback to the network device 410 to indicate its decision on the logical channel(s) 502 in the congestion status. Specifically, the target terminal device 420 transmits 635 to the network device 410 a response indicating whether the at least one logical channel 502 in the congestion status is to be released or maintained. In some embodiments, if a logical channel 502 in the congestion status is determined to be maintained, the terminal device 420 may not need to notify the network device 410 of the operation of maintaining this logical channel 502.

The communication of the response may also be performed via out-of-band communication or in-band communication, with respect to the communication of the status information. The network device 410 receives 640 the response. If the response indicates that the at least one logical channel 502 in the congestion status is to be released, the assigned resources, including processing resources, storage resources, and networking resources may be released and de-allocated (e.g., using garbage collection). In some embodiments, upon reception of the response indicating that one or more logical channels 502 are to be released, the network device 410 may further determine to update the mapping to remove the released logical channel(s) 502.

As one or more logical channels 502 are released, the number of logical channels assigned to the overloaded resource set(s) 510 is reduced. As such, it is possible to improve the workload balancing across the resource sets and ensure the overall performance in the communication system. In the case that the terminal device re-establishes the logical channel with the network device after a period of time, there is a chance that the re-established logical channel can be mapped to a different, under-loaded resource set to further improve the workload imbalance.

It should be appreciated that although the decision regarding how to proceed with a logical channel in a congestion status is performed by the terminal device 420, in other embodiments, the network device 410 may also make such a decision (for example, in a similar way as described with respect to the terminal device 420). In such cases, the network device 410 may transmit to the terminal device 420 a response indicating whether the logical channel is to be released.

The system illustrated in FIG. 6 has several advantages. For example, the system reduces DTCH overlap bottleneck. Channel overlap and resource-set imbalance are avoided, and thus users get a better throughput for each packet transmission; allowing for the system to have better performance. In a dedicated logical channel overlap situation, when initiators are performing smaller packet transmission simultaneously, performance goes down as the same resources cater to each packet at a time. Thus, overall performance degradation can be avoided with systems of the present disclosure. The system increases in/out operations per second ("IOPs"). Since channel to resource overlapping is not present, users connected to the network device 410 will experience better performance for the smaller sized telecom packets which eventually increases the overall IOPs and creates a better user experience. The system has improved load balancing across resources. As overlapping of the logical channels is determined and raised during DTCH CREATE time, this leads to more equilibrium for loads across all the resource-sets of the network and a more balanced telecom network can be achieved. This method can be implemented using current architecture in coordination with a service orchestration layer and VN function, and this method provides real time solutions to problems.

Figure 7:
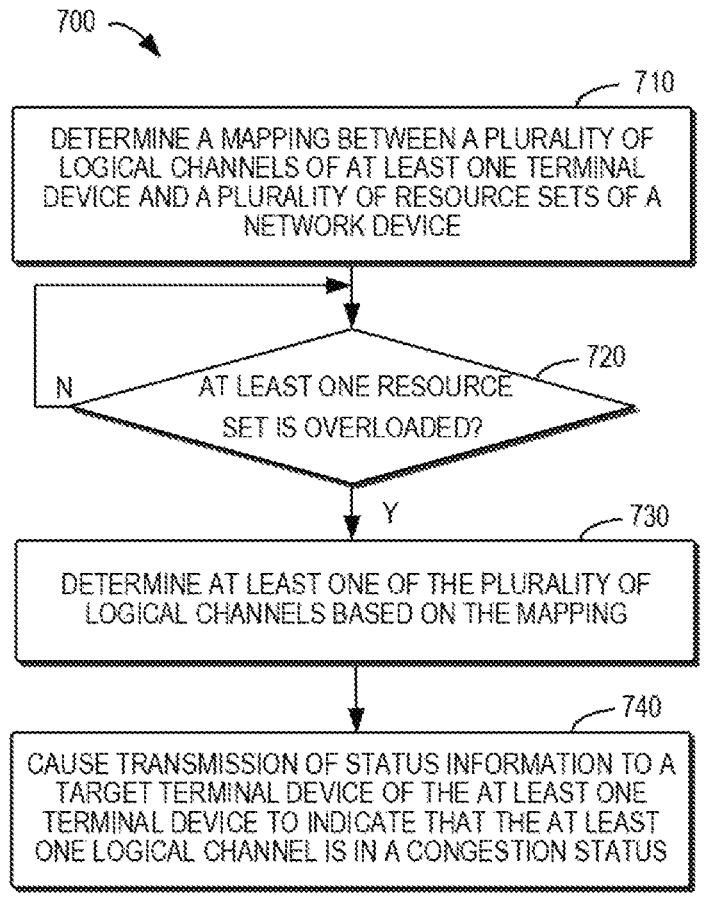
FIG. 7 is a flowchart of an example method of logical channel management implemented at a network device, in accordance with aspects of the present disclosure.

FIG. 7 illustrates a flowchart of an example method 700 of logical channel management according to some embodiments of the present disclosure. The method 700 may be implemented by the network device 410 or a computer system/server comprised in the network device 410. For ease of description, the method 700 is described from the perspective of the network device 410.

At operation 710, the network device 410 determines a mapping between a plurality of logical channels of at least one terminal device and a plurality of resource sets of a network device. In some embodiments, the plurality of resource sets are assigned for communication between the at least one terminal device and the network device via the plurality of logical channels. In some embodiments, method 700 proceeds to operation 720. At operation 720, the network device 410 determines whether at least one of the plurality of resource sets is overloaded. In some embodiments, if no overloaded resource set is found, the network device 410 may continue to determine whether at least one of the plurality of resource sets is overloaded.

In some embodiments, method 700 proceeds to operation 730. In accordance with a determination that at least one of the plurality of resource sets is overloaded, at operation 730, the network device 410 determines at least one of the plurality of logical channels based on the mapping. In some embodiments, method 700 proceeds to operation 740. At block 740, the network device 410 causes transmission of status information indicating that that the at least one logical channel is in a congestion status to a target terminal device of the at least one terminal device. In some embodiments, the target terminal device communicates with the network device via the at least one logical channel. In some embodiments, the network device 410 may control its wireless transceiver to transmit the status information.

In some embodiments, the mapping comprises respective channel identifiers of the plurality of logical channels, at least one respective device identifier of the at least one terminal device, and respective set identifiers of the plurality of resource sets.

In some embodiments, the method 700 further comprises determining whether the at least one of the plurality of resource sets is overloaded based on at least one of the following: respective workloads for the plurality of resource sets, respective quality of service (QoS) requirements for the plurality of logical channels, respective resource allocation requirements for the plurality of logical channels, or resource sharing among the plurality of resource sets.

In some embodiments, the method 700 further comprises in accordance with a determination that a further logical channel is established for a further terminal device, determining a resource set of the plurality of resource sets assigned for communication between the further terminal device and the network device via the further logical channel; and updating the mapping based on the further logical channel and the determined resource set.

In some embodiments, the method 700 further comprises receiving or causing reception of a response from the target terminal device, the response indicating whether the at least one logical channel is to be released by the target terminal device; and updating the mapping in response to the response indicating that the at least one logical channel is to be released by the target terminal device.

In some embodiments, the plurality of logical channels comprise a plurality of dedicated traffic channels (DTCHs) for traffic communication.

In some embodiments, a resource set of the plurality of resource sets comprises a networking resource, a processing resource, and a storage resource.

Figure 8:
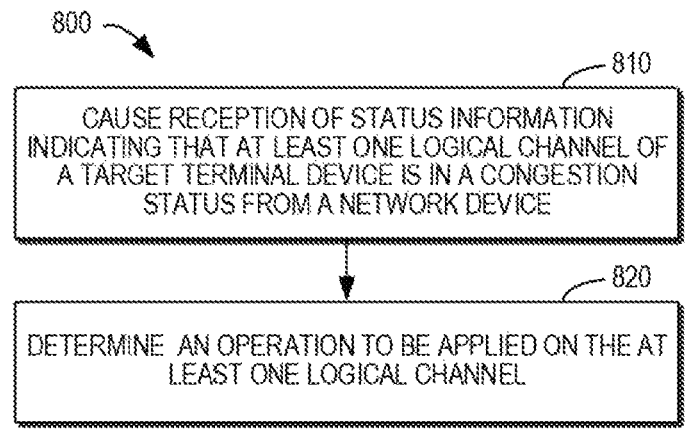
FIG. 8 is a flowchart of an example method of logical channel management implemented at a terminal device, in accordance with aspects of the present disclosure.

FIG. 8 illustrates a flowchart of an example method 800 of logical channel management according to some embodiments of the present disclosure. The method 800 may be implemented by the terminal device 420 or a computer system/server comprised in the terminal device 420. For ease of discussion, the method 800 is described from the perspective of the terminal device 420.

In some embodiments, method 800 begins at operation 810. At operation 810, the terminal device 420 receives or causes reception of status information indicating that at least one logical channel of a target terminal device is in a congestion status from a network device. In some embodiments, a resource set of the network device is assigned for communication between the target terminal device and the network device via the at least one logical channel. The terminal device 420 may control its wireless transceiver to receive the status information. In some embodiments, method 800, proceeds to operation 820. At operation 820, in response to the status information, the terminal device 420 determines an operation to be applied on the at least one logical channel based on at least one of a workload pattern of the at least one logical channel and a quality of service (QoS) requirement for the least one logical channel.

An exemplary method of logical channel management according to some embodiments of the present disclosure is described in the following. The method may run on two exemplary networks: an network device of a 5G telecom network (hereafter referred as eNodeB instance) and second instance is running at terminal device (e.g., user device) layer at a lower level of a Network Softwarization and Programmability Framework (hereafter referred as UE instance). Upon INIT/RELOAD or power-on operation of network device, all the required information is sent to the service orchestration layer of the 5G telecom network. This information includes, the number of sets of resources, the models of network device like resource sharing, only-network sharing or no-share the network device. Other information such as resource profiles and hardware details are shared with Service instance to service orchestration layer. When a terminal device connects to the network device, after performing initial authentication and other checks, a bearer ID is generated for that user which is then used for all further transactions with the RAN (Radio Access Network) between the terminal device and the network device. Once a Channel ID is generated, the information about the channel is parsed and shared with a DTCH manager in the network device software service. This data includes, for example, Source application IDs, device identifiers (UUIDs) and channel's individual details (e.g., QCI levels, BW allocation requirements, etc.). Once any change in the bearer characteristics are detected, the SIGNAL to the eNodeB instance is performed with the change data to update the policy by the UE instances (essentially the UE instance is a light weightage process that knows all the channels created from the current device to the network device). The network device checks the number of connection(s) already present and total DTCH created and distributed on all the available resource-sets based on the previous connections and collected resource information from Programmability Framework. The network device will check the workload of the 10 queues created on each resource-set and keeps the mapping of <channels, applications, resource-set> as a tuple for all the elements in the system. This creates requirements for a terminal device and dedicated application DTCH workload and gives overall picture of number of resources and assignment along with associated workloads on the resource-sets.

If imbalance in the resource-sets is detected for a predefined time interval by the resource-based workload monitoring demon, then the terminal devices are identified which are affected because of disequilibrium. This can be performed via fetching the details of the central processing unit workload, memory workload and network workload collected. If it is identified that some of the device/application dedicated logical channels are creating situation of DTCH overlap and terminal devices are generating more network workload on these channels which are served by same resource sets (e.g., can be obtain by virtual network functions), then the SIGNAL is generated for network device notification engine to send the notification to the corresponding terminal device/channel owner application. The network device will notify the Host either through internal communication or through the protocol about the DTCH overlapping situations. Here, protocol-based implementation can be used like asynchronous request command or can be performed using out-of-band implementation via creating native API based approaches that will be used to notify US. The terminal device decides whether to go ahead with the DTCH connection or abort or reduce the dedicated channel number to the network device.

In some embodiments, determining the operation to be applied on the at least one logical channel based on the workload pattern comprises: in accordance with a determination that the at least one logical channel has a latency-sensitive workload pattern, determining a first operation of releasing the at least one logical channel; and in accordance with a determination that the at least one logical channel has a latency-insensitive workload pattern, determining a second operation of maintaining the at least one logical channel.

In some embodiments, determining the operation to be applied on the at least one logical channel based on the QoS requirement comprises: in accordance with a determination that a decreased level of a QoS on the at least one logical channel exceeds a permissible limit based on the QoS requirement, determining a first operation of releasing the at least one logical channel; and in accordance with a determination that a decreased level of a QoS on the at least one logical channel is within the permissible limit, determining a second operation of maintaining the at least one logical channel.

In some embodiments, the method 800 further comprises causing transmission of a response to the network device based on the determined operation, the response indicating whether the at least one logical channel is to be released.

In some embodiments, the at least one logical channel comprises a dedicated traffic channel (DTCH) for traffic communication.

While operations of the method are depicted in a particular order, it should not be understood as requiring that such operations are performed in the particular order as shown in a sequential order, or that all illustrated operations be performed, to achieve desirable results. In certain circumstances, multitasking and parallel processing may be advantageous.

It should be noted that the processing of logical channel management implemented by the network device 410 according to embodiments of this disclosure could be implemented by computer system/server 12 of FIG. 1, and the processing of logical channel management implemented by the terminal device 420 according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   determining, by one or more processors, a mapping between a plurality of logical channels of at least one terminal device and a plurality of resource sets of a network device, the plurality of resource sets being assigned for communication between the at least one terminal device and the network device via the plurality of logical channels, wherein the plurality of resource sets are shared among the plurality of logical channels;
   detecting, by one or more processors, a workload imbalance among the plurality of resource sets;
   determining, by one or more processors, at least one of the plurality of logical channels based on the mapping in accordance with a determination that at least one of the plurality of resource sets is overloaded, wherein the determination is based, at least in part, on the workload imbalance among the plurality of resource sets; and
   causing, by one or more processors, transmission of status information indicating that that the at least one logical channel is in a congestion status to a target terminal device of the at least one terminal device, the target terminal device communicating with the network device via the at least one logical channel.

2. The method of claim 1, wherein the mapping comprises respective channel identifiers of the plurality of logical channels, at least one respective device identifier of the at least one terminal device, and respective set identifiers of the plurality of resource sets.

3. The method of claim 1, further comprising:
   determining, by one or more processors, whether the at least one of the plurality of resource sets is overloaded based on at least one of the following:
   respective workloads for the plurality of resource sets, respective quality of service (QoS) requirements for the plurality of logical channels, respective resource allocation requirements for the plurality of logical channels, or resource sharing among the plurality of resource sets.

4. The method of claim 1, further comprising:
determining, by one or more processors, a resource set of the plurality of resource sets assigned for communication between a further terminal device and the network device via a further logical channel in accordance with a determination that the further logical channel is established for the further terminal device; and
updating, by one or more processors, the mapping based on the further logical channel and the determined resource set.

5. The method of claim 1, further comprising:
receiving, by one or more processors, a response from the target terminal device, the response indicating whether the at least one logical channel is to be released by the target terminal device; and
updating, by one or more processors, the mapping in response to the response indicating that the at least one logical channel is to be released by the target terminal device.

6. The method of claim 1, wherein the plurality of logical channels comprise a plurality of dedicated traffic channels (DTCHs) for traffic communication.

7. The method of claim 1, wherein a resource set of the plurality of resource sets comprises a networking resource, a processing resource, and a storage resource.

8. A system comprising: a processing unit; and
a memory coupled to the processing unit and storing instructions thereon, the instructions, when executed by the processing unit, performing acts including:
determining a mapping between a plurality of logical channels of at least one terminal device and a plurality of resource sets of a network device, the plurality of resource sets being assigned for communication between the at least one terminal device and the network device via the plurality of logical channels, wherein the plurality of resource sets are shared among the plurality of logical channels;
detecting a workload imbalance among the plurality of resource sets;
determining at least one of the plurality of logical channels based on the mapping in accordance with a determination that at least one of the plurality of resource sets is overloaded, wherein the determination is based, at least in part, on the workload imbalance among the plurality of resource sets; and
causing transmission of status information indicating that the at least one logical channel is in a congestion status to a target terminal device of the at least one terminal device, the target terminal device communicating with the network device via the at least one logical channel.

9. The system of claim 8, wherein the mapping comprises respective channel identifiers of the plurality of logical channels, at least one respective device identifier of the at least one terminal device, and respective set identifiers of the plurality of resource sets.

10. The system of claim 8, wherein the acts further comprise:
determining whether the at least one of the plurality of resource sets is overloaded based on at least one of the following:
respective workloads for the plurality of resource sets,
respective quality of service (QoS) requirements for the plurality of logical channels, respective resource allocation requirements for the plurality of logical channels, or resource sharing among the plurality of resource sets.

11. The system of claim 8, wherein the acts further comprise:
determining a resource set of the plurality of resource sets assigned for communication between the further terminal device and the network device via the further logical channel in accordance with a determination that a further logical channel is established for a further terminal device; and
updating the mapping based on the further logical channel and the determined resource set.

12. The system of claim 8, wherein the acts further comprise:
receiving a response from the target terminal device, the response indicating whether the at least one logical channel is to be released by the target terminal device; and
updating the mapping in response to the response indicating that the at least one logical channel is to be released by the target terminal device.

13. The system of claim 8, wherein the plurality of logical channels comprise a plurality of dedicated traffic channels (DTCHs) for traffic communication.

14. The system of claim 8, wherein a resource set of the plurality of resource sets comprises a networking resource, a processing resource, and a storage resource.

* * * * *